Patented Mar. 9, 1948

2,437,297

UNITED STATES PATENT OFFICE 2,437,297

TREATMENT OF DRILLING FLUIDS

Allen D. Garrison, Houston, Tex., assignor to Texaco Development Corporation, New York, N. Y., a corporation of Delaware No Drawing. Application October 25, 1944, Serial No. 560,343

25 Claims. (Cl. 252—8.5)

This invention relates to drilling wells such as oil and gas wells and particularly relates to the treatment of the drilling fluids used in such operations.

This application is a continuation-in-part of my application Serial No. 527,965, filed March 24, 1944 (now abandoned).

The rotary method is used in drilling most wells today. This method comprises drilling the well by means of a bit suspended on a hollow drill pipe which is rotated and lowered into the hole as the drilling proceeds. During the drilling a drilling fluid is usually passed down the drill pipe to the locus of drilling and is returned to the surface through the annular space between the drill pipe and wall of the hole or the casing, if casing has been set. The drilling fluid issuing from the well is usually passed over a screen and through a channel or ditch to a mud pit from which it is pumped back to the drill pipe.

Drilling fluids are usually aqueous suspensions of clays that have special properties which fit them to perform their functions in the drilling operation. Among these functions is the carrying of cuttings from the locus of drilling to the surface where the cuttings drop out in the mud ditch or pit. To perform this function a drilling fluid must have a selected viscosity such that the fluid may be pumped through the system and also such that the cuttings will remain suspended in the fluid during the flow of the fluid up the well. Also, the fluid, when it is relatively quiescent, should permit the cuttings to fall a few feet since it is essential that the cuttings settle out at the surface. On the other hand, the fluid should have the property of gelling on standing, in order to avoid permitting undue settling of the cuttings in the well itself when drilling and circulation of fluid are temporarily halted. Accordingly, a drilling fluid should be thixotropic, i. e., it should be fluid when subjected to agitation but should set to a gel of sufficient strength to retain cuttings in the time required for the cuttings to settle a few feet.

The properties of a drilling fluid are changed during drilling because the hole traverses strata which are composed of shales, clays, etc., which become dispersed in the fluid. When the strata traversed contain certain clays or compounds such as alkaline earth metal compounds, particularly calcium compounds, or when cement is being drilled out, the drilling fluid is liable to become too viscous. In drilling a well in many fields it is necessary to keep a close watch on the drilling fluid and to treat it with chemicals at the surface so as to counteract the effect of contaminants. Also, it has been proposed to treat a drilling fluid in advance of contamination with a chemical which will neutralize the effect of the contaminant. This is possible because after one or more wells have been drilled in a field the location of contaminating strata is known, and where a cement job has been done, it is of course known that the cement will first be encountered on the resumption of drilling.

The present invention is concerned with the control of the viscosity of an aqueous drilling fluid and has for its principal object the control of the viscosity of such a drilling fluid without adversely affecting the other properties of the fluid by means of a novel and effective combination of chemicals.

I have discovered in accordance with the invention that the viscosity of an aqueous drilling fluid may be controlled efficiently by treating the drilling fluid with an insoluble alkali metal or ammonium metaphosphate and a salt of a dissimilar alkali metal or ammonium with an aliphatic carboxylic acid which contains in addition to the characteristic carboxylic acid group at least one member selected from the group consisting of hydroxyl groups and carboxylic acid groups, which salt is at least colloidally soluble in water. Thus, the acids may contain in addition to the characteristic carboxylic acid group one or more hydroxyl groups, one or more carboxylic acid groups or one or more of each of these groups. By dissimilar alkali metal or ammonium it is of course meant that the cation of the salt consists of a different radical from that constituting the cation of the metaphosphate. These carboxylic acid salts have been found themselves to have a viscosity reducing action which contributes to the value of the combination. The alkali metal or ammonium metaphosphate and alkali metal or ammonium salt combination has important advantages as a treating agent for drilling muds, which advantages will be apparent as the description proceeds.

Insoluble sodium metaphosphate is the most easily available insoluble alkali metal metaphosphate and most of the following detailed description will be concerned with this compound, but it will be understood that the invention also includes the use of other insoluble alkali metal metaphosphates, such as the potassium and lithium compounds. Insoluble sodium metaphosphate has been termed "Maddrell's salt" and is generally known as sodium monometaphosphate, although there appears to be some question as to whether this designation is wholly accurate. However, in view of this established usage, the insoluble metaphosphates will be referred to hereinafter as the monometaphosphates.

Sodium monometaphosphate may be prepared by molecularly dehydrating monosodium orthophosphate at a temperature below 500° C., for example, between about 300 and 500° C. There is evidence that the metaphosphate exists in two crystalline forms depending on whether the heating is conducted below about 425° C. or between 425 and 475 to 500° C. In any case, this sodium metaphosphate or monometaphosphate is at best only slowly soluble in water and is to be distinguished from the so-called sodium trimetaphosphate made by heating to 500° to 625° C., followed by slow cooling.

Sodium monometaphosphate alone is relatively unsatisfactory for addition to drilling fluids in general. While, if sufficient time is provided, some reduction in viscosity is effected in all cases, and in some cases may be of important magnitude, the reduction is not sufficiently pronounced on many untreated fluids to make this salt available for use in situations where the above combination of chemicals is effective. Moreover, the time required for the action to take place is too long in many cases where it is essential that the mud condition be corrected promptly.

I have found, however, that by using a dissimilar alkali metal or ammonium salt of an aliphatic carboxylic acid of the above class which is at least colloidally soluble in water in conjunction with sodium monometaphosphate the viscosity of an aqueous drilling fluid is reduced to a desirable low value in a short period of time. The effect of a selected amount of the combination is generally greater than the effect of the same amount of either of the constituents even if the time factor is disregarded. The reason for this result is not understood, but it appears that the dissimilar alkali metal or ammonium salt exerts not only its own viscosity-reducing effect but also functions to activate the insoluble monometaphosphate.

A wide variety of alkali metal and ammonium salts may be employed with the monometaphosphates in accordance with the invention. As examples of such compounds there may be mentioned sodium, potassium, lithium and ammonium salts of such acids as citric acid, glycolic acid, lactic acid, maleic acid, malic acid, malonic acid, oxalic acid, saccharic acid, succinic acid and tartaric acid.

It will be understood that the alkali metal and ammonium carboxylic acid salts which may be employed in accordance with the invention will vary in degree, in value and in the ease with which they may be used. Most of the viscosity-reducing agents which have been proposed for use in the treatment of drilling fluids have the disadvantage that when an amount of the agent is used materially above the amount required to achieve maximum viscosity reduction the viscosity reduction is liable to be reversed and an increase in viscosity will be obtained. When a salt is used which itself is capable of causing this reversion, the reversion may occur even when the combination disclosed herein is used. I have found, however, that the reversion in many cases does not take place even when a large excess is used, and where it does take place it occurs only after a much larger quantity of the combination has been used than of the carboxylic acid salt alone.

The alkali metal and ammonium salts of aliphatic carboxylic acids which contain at least one hydroxyl group or carboxylic acid group as substituents comprise a class which is set apart even from related compounds when their effect in the combinations of the present invention is considered. The salts of simple aliphatic monocarboxylic acids such as acetic acid are not desirable for use, although their salts do function to activate the monometaphosphate, because their salts have been found to tend to flocculate or increase the viscosity of the drilling fluid and therefore counteract the effect of the monometaphosphate.

The alkali metal and ammonium salts of several of the acids of the above class are themselves good viscosity-reducing agents and on certain drilling fluids they may exert a substantial viscosity-reducing effect; an effect, however, which is less than the effect of the same amount of the combinations. The combinations, moreover, have the important advantage of being applicable to the treatment of a wide variety of fluids, whereas the salts alone can be used with reasonable success only on particular fluids. Further, as stated previously, the combinations have been found to be capable of use in much larger excess without causing a reversal of the viscosity-reducing effect, and the preferred combinations do not appear to cause a reversal even when used in large excess. This feature is important when the fluid has to be treated several times to overcome successive viscosity increases caused by the hole's traversing successive contaminating strata. It is important also when the treating agent is added too rapidly to a portion of the circulating stream of drilling fluid so that in that portion the concentration of the agent is greater than intended for the entire body of fluid.

The alkali metal or ammonium monometaphosphate may be employed in various ways in practicing the invention. I prefer to add the monometaphosphate to an aqueous solution, true or colloidal, of the dissimilar alkali metal or ammonium carboxylic acid salt and to add the resulting solution or suspension to the drilling fluid. By this procedure, particularly if the solution is heated after the addition of the monometaphosphate or the phosphate is added to a hot solution, the phosphate may be completely solubilized and made capable of exerting its action rapidly. Effective dry combinations may be made by evaporating to dryness a solution or suspension of the combination. The dry material is preferably dissolved or dispersed in water prior to addition to the drilling fluid. The invention also includes procedures wherein the monometaphosphate and the compound or compounds are mixed in the dry form and the dry mixture is added to the fluid, and wherein the compounds are added to the fluid in either order.

The combination of chemicals is preferably employed in practice by obtaining samples of the drilling fluid to be treated and then adding to the samples various amounts of the combination to determine the amount which will reduce the viscosity of the drilling fluid to the desired point or which will immunize the fluid against anticipated contamination if the fluid is treated prior to contamination. The amount to be used will generally fall within the limits of 0.001 to 0.1 per cent, based on the weight of the fluid, and generally within the limits of about 0.01 to 0.08 per cent. However, since reversal of viscosity reduction does not occur, or at least not until a large excess has been used, in treating some fluids with the preferred combinations a larger amount of the combinations than indicated by these figures may be found desirable.

With respect to the optimum amount of alkali metal or ammonium carboxylic acid salt to be used, this may also be determined by tests on the fluid in question. It may be stated that if this compound is used in proportions corresponding to a weight ratio of monometaphosphate to compound within the range of 2:1 to 1:2, the desired effect will be obtained. However, the specific amount does not appear to be critical and the use of smaller and larger amounts than indicated by these ratios, depending upon the specific characteristics of the salt, will produce active combinations.

The preferred combinations in accordance with the invention are composed of sodium, ammonium and lithium monometaphosphates and carboxylic acid salts. I have found that combinations containing potassium monometaphosphate have a tendency to cause an initial gelling effect on the drilling fluid and while this tendency does not render these compounds inoperative, it is a disadvantage which is not possessed, for example, by the sodium monometaphosphate. I have also found that the potassium ion whether present in the monometaphosphate or the carboxylic acid salt is liable to cause a reversal of the viscosity-reducing effect of the combinations when a smaller excess is added than in the cases of combinations which do not include potassium compounds. Since sodium monometaphosphate is readily available, I prefer to employ combinations of this salt with ammonium and lithium carboxylic acid salts.

It will be understood that a mixture of alkali metal or ammonium carboxylic acid salts as well as a single compound may be employed in accordance with the invention. I have found that ammonium salts are valuable materials both from the standpoint of activating sodium monometaphosphate and from the standpoint of cheapness of production. Lithium salts, on the other hand, are especially valuable from the overloading standpoint but are generally expensive. I have found that by using either a mixture of ammonium and lithium salts or a mixed lithium-ammonium salt where the acid employed in the preparation of the salt has more than one acid radical, the advantages residing in the activating properties of the lithium radical may be obtained while maintaining the cost of the treatment at a satisfactory low point.

In order to understand the invention more fully reference should be had to the following examples:

EXAMPLE I

In this example the drilling fluid subjected to test and treatment was a Gulf Coast aqueous fluid comprising a clay suspension which is characteristic of drilling fluids employed in drilling through marine shales in the Gulf Coast of Texas. The specific gravity of the fluid was 1.23. The instrument employed to determine viscosities was similar to the Stormer viscosimeter but changes had been made to improve the control of the times and rates of rotation. All samples of drilling fluid listed in the following table were run 2 minutes at 900 R. P. M. and 3 minutes at 600 R. P. M., the temperature being maintained at about 25° C. The carboxylic acid salt used was ammonium acid citrate, $(NH_4)_2HC_6H_5O_7$. The materials were added in water solution or suspension and the amount of water added is indicated in the table. The various treating agents were added to the untreated fluid, which was then permitted to stand for one hour before making the test. Tests with sodium hexametaphosphate are included for the purposes of comparison.

TABLE 1

Additions to the drilling fluid as indicated in grams per 100 cc. fluid

| Water | Sodium Monometaphosphate | Sodium Hexametaphosphate | Ammonium Citrate | Viscosity in Centipoises |
|---|---|---|---|---|
| 1.6 | | | | 50.5 |
| 1.6 | .02 | | | 42.5 |
| 1.6 | .02 | | | 42.0 |
| 1.6 | | | .04 | 14.4 |
| 1.6 | .02 | | .04 | 20.3 |
| 1.6 | | .02 | | 22.0 |
| 1.6 | | .02 | .04 | 17.5 |

These results establish the value of the combinations when applied to a drilling fluid. The sodium monometaphosphate alone when added to the drilling fluid under the test conditions had virtually no effect on the viscosity of the fluid; whereas the combination markedly reduced the viscosity of the fluid.

EXAMPLE II

In this example, the drilling fluid used was similar to that described in Example I, but was taken from the well at a different time during drilling and was somewhat different in its susceptibility to treatment. The materials used in the treatment of this fluid, which had a specific gravity of 1.2, were solution A containing 5 grams of citric acid monohydrate, 1.67 grams $NH_4OH$, and .377 gram of lithium hydroxide in 100 cc. of solution; and solution B containing 3 grams of sodium monometaphosphate, 5 grams of citric acid monohydrate, 1.67 grams of $NH_4OH$ and .382 gram of lithium hydroxide in 100 cc. of solution. In both cases the solutions were prepared at 67° C. and the tests were made at 25° C. In the following table agent A refers to the materials other than water in solution A and agent B refers to the materials other than water in solution B.

TABLE 2

| Grams of Agent A per 100 cc. of Drilling Fluid | Grams of Agent B per 100 cc. of Drilling Fluid | Viscosity of Drilling Fluid Centipoises |
|---|---|---|
| | | 50.3 |
| 0.00248 | | 29.7 |
| | 0.00398 | 20.1 |
| 0.00500 | | 25.0 |
| | 0.00805 | 14.7 |
| 0.0102 | | 18.8 |
| | 0.01642 | 10.7 |
| 0.0207 | | 13.9 |
| | 0.0336 | 8.2 |
| 0.0422 | | 11.4 |
| | 0.0686 | 6.7 |
| | 0.1393 | 6.1 |
| | 0.282 | 5.7 |

From these data it will be seen that solution B, a combination in accordance with the invention, throughout the range of additions caused a greater viscosity reduction than solution A, a composition similar to solution B with the exception of sodium monometaphosphate.

EXAMPLE III

In this example the same drilling fluid was treated as in Example II. The reagent employed was an aqueous suspension made up to contain 20 grams of sodium monometaphosphate, 10 grams of glycolic acid (hydroxy-acetic acid), 0.788 gram of lithium hydroxide and 3.46 grams $NH_4OH$ in 100 cc. of the suspension. The materials other than the water are considered as the treating agent. The results obtained, using the procedure described in Example II, were as follows:

TABLE 3

| Grams Agent per 100 cc. of Drilling Fluid | Viscosity of Drilling Fluid in Centipoises |
|---|---|
| ---------- | 50.3 |
| 0.01411 | 25.9 |
| 0.02856 | 19.7 |
| 0.05776 | 13.0 |
| 0.1170 | 10.0 |
| 0.239 | 9.1 |
| 0.486 | 6.7 |
| 0.981 | 5.8 |
| 1.752 | 7.0 |

It is worthy of note here that despite the addition of the agent in amount far in excess of that required to achieve maximum viscosity reduction, there was only a slight viscosity increase.

EXAMPLE IV

This example is similar to Example III, but the agent used was an aqueous suspension prepared to contain 20 grams of sodium monometaphosphate, 4.28 grams of glycolic acid, .382 gram of lithium hydroxide and 1.67 grams of $NH_4OH$ in 100 cc. of suspension. The pH of the suspension was 7.81. In the following table the amount of addition of the agent is reported on the basis of the total weight of the sodium monometaphosphate and the glycolic acid added.

TABLE 4

| Grams Agent per 100 cc. of Drilling Fluid | Viscosity of Drilling Fluid in Centipoises |
|---|---|
| ---------- | 50.3 |
| 0.01157 | 31.3 |
| 0.02329 | 27.6 |
| 0.0471 | 21.7 |
| 0.0956 | 17.2 |
| 0.1943 | 11.0 |
| 0.3932 | 8.0 |
| 0.7932 | 5.6 |
| 1.422 | 5.0 |

EXAMPLE V

This example is similar to Example III, but the agent used was an aqueous suspension prepared to contain 20 grams of sodium monometaphosphate, 10 grams of oxalic acid and 3.89 grams of $NH_4OH$ in 100 cc. of the suspension. In the following table the agent is the materials other than the water contained in the suspension.

TABLE 5

| Grams Agent per 100 cc. of Drilling Fluid | Viscosity of Drilling Fluid in Centipoises |
|---|---|
| ---------- | 50.3 |
| 0.0148 | 22.6 |
| 0.0300 | 14.7 |
| 0.0609 | 11.1 |
| 0.1240 | 7.7 |
| 0.2513 | 7.0 |
| 0.507 | 6.5 |
| 1.030 | 6.5 |
| 1.36 | 6.5 |
| 1.63 | 9.4 |

EXAMPLE VI

In this example a drilling fluid similar to that employed in Example II but having a viscosity of 49.5 centipoises was subjected to test. The treating agent employed was an aqueous suspension prepared to contain 20 grams of potassium monometaphosphate and 10 grams of ammonium acid citrate in 100 cc. of the suspension. The amount of the suspension corresponding to .03 gram of potassium monometaphosphate and ammonium acid citrate was added to the drilling fluid. Ten minutes after the addition the viscosity of the fluid had risen to 70.2 centipoises. From that time on the viscosity of the fluid decreased steadily until 60 minutes after the addition when the viscosity reached a constant low point of 13.2 centipoises.

In another test with this treating agent the drilling fluid after the addition was permitted to stand for 107 minutes at which time it had reached the low viscosity of 13.2 centipoises.

It will be understood that the foregoing examples are presented for illustrative purposes and are not intended as limitations of the invention. Thus, in place of the specific combinations disclosed in the examples, there may be employed other combinations of the class previously disclosed.

As previously stated, when using sodium monometaphosphate it is preferred to use ammonium and lithium salts of the aliphatic carboxylic acids. Especially preferred in this case are ammonium and lithium salts of citric and glycolic acids. The salts of citric acid may be the acid salts and may be prepared by dissolving citric acid in water and adding ammonium hydroxide and/or lithium hydroxide to obtain a selected pH. Solutions having pH values between 4 and 5, for example, have been found to be satisfactory. The sodium monometaphosphate may be added at any desired point before or after the formation of the citrate.

The specific results obtained in the treatment of various drilling fluids will vary depending upon the composition of the fluids. Drilling fluids contain clays of divergent characteristics such as bentonites of various types and clays taken up by the fluid during drilling. They may also contain weighting agents such as barytes and iron oxide. Moreover, they may become contaminated with various materials such as calcium and magnesium salts which may enter the drilling fluid from formations traversed during drilling or from cement placed in the hole during a casing operation or for the purpose of shutting off a troublesome formation. Accordingly, it will not be possible in many cases to reduce the viscosity to as low a point as was possible in the treatment of the drilling fluids employed in the examples, but those skilled in the art will recognize that it is not necessary or even desirable in many cases to reduce the viscosity of a drilling fluid to an exceedingly low point.

Obviously many modifications and variations of the invention, as hereinbefore set forth, may be made without departing from the spirit and scope thereof, and therefore only such limitations should be imposed as are indicated in the appended claims

I claim:

1. The process of controlling the viscosity of an aqueous drilling fluid employed in drilling a well which comprises treating the fluid with an amount sufficient to control the viscosity of a combination containing a substantial proportion of a water-insoluble monometaphosphate having a cation selected from the group consisting of the alkali metals and ammonium together with a sufficient amount to activate said monometaphosphate of an at least colloidally soluble salt having a dissimilar cation selected from the group consisting of the alkali metals and ammonium, and an anion consisting of a radical of an aliphatic carboxylic acid containing in addition to the characteristic carboxylic acid group at least one member selected from the group consisting of hydroxyl groups and carboxylic acid groups.

2. A process in accordance with claim 1 in which about 0.001 to 0.1 per cent, based on the weight of the drilling fluid, of the combination of said monometaphosphate and said at least colloidally soluble salt is employed.

3. A process in accordance with claim 1 in which the water-insoluble monometaphosphate and the at least colloidally soluble salt are added to the fluid in aqueous admixture.

4. A drilling fluid comprising an aqueous suspension of clay containing an amount sufficient to control the viscosity of the drilling fluid of a combination containing a substantial proportion of a water-insoluble monometaphosphate having a cation selected from the group consisting of the alkali metals and ammonium together with a sufficient amount to activate said monometaphosphate of a water-soluble salt having a dissimilar cation selected from the group consisting of the alkali metals and ammonium and an anion consisting of a radical of an aliphatic carboxylic acid containing in addition to the characteristic carboxylic acid group at least one member selected from the group consisting of hydroxyl groups and carboxylic acid groups.

5. A drilling fluid in accordance with claim 4 in which the cation of the monometaphosphate is sodium, the cation of the at least colloidally soluble salt is ammonium and the anion of said salt is a radical of an aliphatic polybasic carboxylic acid.

6. The process of controlling the viscosity of an aqueous drilling fluid which comprises treating the fluid with an amount sufficient to control the viscosity of a combination containing a substantial proportion of a water-insoluble alkali metal monometaphosphate together with a sufficient amount to activate said monometaphosphate an at least colloidally soluble salt having as the cation a dissimilar alkali metal and as the anion an aliphatic hydroxy carboxylic acid radical.

7. A process in accordance with claim 6 in which the anion of the at least colloidally soluble salt is the glycolic acid radical.

8. The process of controlling the viscosity of an aqueous drilling fluid which comprises treating the fluid with an amount sufficient to control the viscosity of a combination containing a substantial proportion of a water-insoluble alkali metal monometaphosphate together with a sufficient amount to activate said monometaphosphate an at least colloidally soluble salt having as the cation a dissimilar alkali metal and as the anion an aliphatic polybasic carboxylic acid radical.

9. A process in accordance with claim 8 in which the anion of the at least colloidally salt is the citric acid radical.

10. The process of controlling the viscosity of an aqueous drilling fluid which comprises treating the fluid with an amount sufficient to control the viscosity of a combination containing a substantial proportion of a water-insoluble alkali metal monometaphosphate together with a sufficient amount to activate said monometaphosphate an at least colloidally soluble ammonium salt of an aliphatic hydroxy carboxylic acid.

11. A process in accordance with claim 10 in which the at least colloidally soluble salt is ammonium glycolate and the weight ratio of said monometaphosphate to said salt is within the range of 2:1 to 1:2.

12. The process of controlling the viscosity of an aqueous drilling fluid which comprises treating the fluid with an amount sufficient to control the viscosity of a combination containing a substantial proportion of a water-insoluble alkali metal monometaphosphate together with a sufficient amount to activate said monometaphosphate of an at least colloidally soluble ammonium salt of an aliphatic polybasic carboxylic acid.

13. A process in accordance with claim 12 in which the at least colloidally soluble salt is ammonium citrate and the weight ratio of said monometaphosphate to said salt is within the range of 2:1 to 1:2.

14. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of an at least colloidally soluble ammonium salt of an aliphatic hydroxy carboxylic acid.

15. A process in accordance with claim 14 in which the at least colloidally soluble salt is ammonium glycolate and the weight ratio of said monometaphosphate to said salt is within the range of 2:1 to 1:2.

16. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of an at least colloidally soluble ammonium salt of an aliphatic polybasic carboxylic acid.

17. A process in accordance with claim 16 in which the at least colloidally soluble salt is ammonium citrate and the weight ratio of said monometaphosphate to said salt is within the range of 2:1 to 1:2.

18. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of an at least colloidally soluble lithium salt of an aliphatic hydroxy carboxylic acid.

19. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of an at least colloidally soluble lithium salt of an aliphatic polybasic carboxylic acid.

20. A process in accordance with claim 19 in which the at least colloidally soluble salt is lithium citrate and the weight ratio of said monometaphosphate to said salt is within the range of 2:1 to 1:2.

21. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of a mixture of an at least colloidally soluble ammonium salt of an aliphatic hydroxy carboxylic acid and an at least colloidally soluble lithium salt of an aliphatic hydroxy carboxylic acid.

22. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of a mixture of an at least colloidally soluble ammonium salt of an aliphatic polybasic carboxylic acid and an at least colloidally soluble lithium salt of an aliphatic hydroxy carboxylic acid.

23. A composition of matter adapted for the treatment of aqueous drilling fluids to control the viscosity thereof comprising a water-insoluble monometaphosphate having a cation selected from the group consisting of the alkali metals and ammonium and an at least colloidally soluble salt having a dissimilar cation selected from the group consisting of the alkali metals and ammonium and having an anion consisting of a radical of an aliphatic carboxylic acid containing in addition to the characteristic carboxylic acid group at least one member selected from the group consisting of hydroxyl groups and carboxylic acid groups in sufficient water to produce a freely flowing composition wherein the weight ratio of said monometaphosphate to said salt is within the range of 2:1 to 1:2.

24. A composition of matter in accordance with claim 23 in which the monometaphosphate is sodium monometaphosphate and the at least colloidally soluble salt is ammonium citrate.

25. A composition of matter in accordance with claim 23 in which the monometaphosphate is sodium monometaphosphate and the at least colloidally soluble salt is lithium citrate.

ALLEN D. GARRISON.

REFERENCES CITED

The following references are of record in the file of this patent:

UNITED STATES PATENTS

| Number | Name | Date |
| --- | --- | --- |
| 2,328,426 | Daniel | Aug. 31, 1943 |
| 2,341,581 | Teichmann | Feb. 15, 1944 |
| 2,365,489 | Partridge | Dec. 19, 1944 |
| 2,369,407 | Robinson | Feb. 13, 1945 |
| 2,379,100 | Partridge | June 26, 1945 |

OTHER REFERENCES

Ser. No. 434,621, Rudy et al. (A. P. C.), published June 1, 1943.

---

Certificate of Correction

Patent No. 2,437,297.

March 9, 1948.

ALLEN D. GARRISON

It is hereby certified that errors appear in the printed specification of the above numbered patent requiring correction as follows: Column 9, line 52, claim 6, before the word "an" insert *of*; line 66, claim 8, and column 10, line 5, claim 10, after the syllable "phate" insert *of*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.* metaphosphate to said salt is within the range of 2:1 to 1:2.

21. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of a mixture of an at least colloidally soluble ammonium salt of an aliphatic hydroxy carboxylic acid and an at least colloidally soluble lithium salt of an aliphatic hydroxy carboxylic acid.

22. The process of controlling the viscosity of an aqueous drilling fluid which comprises treating the fluid with an amount sufficient to control the viscosity of a combination containing a substantial proportion of a water-insoluble sodium monometaphosphate together with a sufficient amount to activate said monometaphosphate of a mixture of an at least colloidally soluble ammonium salt of an aliphatic polybasic carboxylic acid and an at least colloidally soluble lithium salt of an aliphatic hydroxy carboxylic acid.

23. A composition of matter adapted for the treatment of aqueous drilling fluids to control the viscosity thereof comprising a water-insoluble monometaphosphate having a cation selected from the group consisting of the alkali metals and ammonium and an at least colloidally soluble salt having a dissimilar cation selected from the group consisting of the alkali metals and ammonium and having an anion consisting of a radical of an aliphatic carboxylic acid containing in addition to the characteristic carboxylic acid group at least one member selected from the group consisting of hydroxyl groups and carboxylic acid groups in sufficient water to produce a freely flowing composition wherein the weight ratio of said monometaphosphate to said salt is within the range of 2:1 to 1:2.

24. A composition of matter in accordance with claim 23 in which the monometaphosphate is sodium monometaphosphate and the at least colloidally soluble salt is ammonium citrate.

25. A composition of matter in accordance with claim 23 in which the monometaphosphate is sodium monometaphosphate and the at least colloidally soluble salt is lithium citrate.

ALLEN D. GARRISON.

REFERENCES CITED

The following references are of record in the file of this patent:

UNITED STATES PATENTS

| Number | Name | Date |
| --- | --- | --- |
| 2,328,426 | Daniel | Aug. 31, 1943 |
| 2,341,581 | Teichmann | Feb. 15, 1944 |
| 2,365,489 | Partridge | Dec. 19, 1944 |
| 2,369,407 | Robinson | Feb. 13, 1945 |
| 2,379,100 | Partridge | June 26, 1945 |

OTHER REFERENCES

Ser. No. 434,621, Rudy et al. (A. P. C.), published June 1, 1943.

Certificate of Correction

Patent No. 2,437,297.  March 9, 1948.

ALLEN D. GARRISON

It is hereby certified that errors appear in the printed specification of the above numbered patent requiring correction as follows: Column 9, line 52, claim 6, before the word "an" insert *of*; line 66, claim 8, and column 10, line 5, claim 10, after the syllable "phate" insert *of*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*